(12) United States Patent
Gretz

(10) Patent No.: US 7,488,891 B1
(45) Date of Patent: Feb. 10, 2009

(54) FIXTURE OR OUTLET BOX WITH SELECTABLE FASTENING POINTS

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 12/156,993

(22) Filed: Jun. 6, 2008

(51) Int. Cl.
*H01H 9/02* (2006.01)

(52) U.S. Cl. .............................. 174/58; 174/50; 174/54; 174/62; 174/64; 174/135; 220/4.02; 248/906; 439/535; 361/600

(58) Field of Classification Search .................. 174/50, 174/53, 54, 57, 61, 63, 64, 62, 58, 59, 135; 220/3.3, 3.4, 3.5, 3.8, 4.02; 361/600, 826; 248/205.1, 218.4, 906, 200, 300; 439/535
See application file for complete search history.

(56) References Cited

U.S. PATENT DOCUMENTS

| | | | |
|---|---|---|---|
| 4,263,472 A | | 4/1981 | Maheu |
| 4,667,840 A | | 5/1987 | Lindsey |
| 4,673,097 A | * | 6/1987 | Schuldt ....................... 220/3.5 |
| 4,927,039 A | * | 5/1990 | McNab ........................ 220/3.7 |
| 6,831,228 B2 | * | 12/2004 | Lalancette et al. ............. 174/58 |
| 6,875,922 B1 | | 4/2005 | Petak et al. |
| 7,173,184 B2 | | 2/2007 | Hull et al. |
| 7,344,115 B2 | | 3/2008 | Case |
| 7,351,910 B1 | * | 4/2008 | Magisano et al. .............. 174/58 |

* cited by examiner

*Primary Examiner*—Dhiru R Patel

(57) ABSTRACT

An electrical box with multiple selectable fastening points. The electrical box is capable of being mounted on a wide range of structures including those that are constructed with metal framing, wood framing, or with a masonry wall. To accommodate various layers of drywall, fasteners for mounting the electrical box to a stud may be moved to any one of the several fastening points to ensure that the fastener is approximately centered with respect to the stud. Outward extending tabs are provided on the sidewalls of the electrical box to enable mounting to masonry walls. Multiple connection points are provided at the front opening of the electrical box to enable the mounting of electrical components or electrical fixtures.

11 Claims, 8 Drawing Sheets

FIXTURE OR OUTLET BOX WITH SELECTABLE FASTENING POINTS

FIELD OF THE INVENTION

This invention relates to electrical junction boxes and specifically to an electrical box assembly for mounting electrical fixtures or components that include selectable fastening points for use in mounting the box assembly to a structure.

BACKGROUND OF THE INVENTION

It is often necessary for an electrician to stock several styles of electrical boxes to accommodate the myriad types of electrical devices, such as electrical fixtures or electrical components, that are affixed to walls and ceilings and also to enable the mounting of these varied devices to various building structures, such as buildings constructed with wood framing, metal framing, or with masonry. This forces the electrician to stock a large number of electrical boxes in order to facilitate the installation of electrical services.

What would be helpful is an electrical box that can be mounted on myriad structures and in various parts of each structure without requiring an electrician or homeowner to find a box specific to the location. For example, it would be helpful to have an electrical box that is adapted to mount both electrical components, such as a duplex receptacle or a switch, and that is also displayed to mount an electrical fixture, such as a light fixture. Additionally, it would be beneficial to have a single electrical box that can be mounted on both metal and wood studs and also on masonry. A versatile electrical box such as this could therefore be mounted on interior walls or on exterior walls where studs can be accessed or where studs are not available, such as for certain memory walls.

SUMMARY OF THE INVENTION

The invention is an electrical box with multiple selectable fastening points. The electrical box is capable of being mounted on a wide range of structures including those that include metal framing, wood framing, or are finished with masonry. The box includes mounting fasteners that may be shifted to alternate positions to enable mounting the box with single or multiple layers of drywall. Outward extending tabs are provided on the sidewalls of the electrical box to enable mounting to masonry walls. Multiple connection points are provided at the front opening of the electrical box to enable the mounting of electrical components or electrical fixtures.

OBJECTS AND ADVANTAGES

Several advantages are achieved with the electrical box of the present invention, including:

(1) The electrical box of the present invention includes multiple fastening points, selectable by the user, to enable mounting to walls with one or several layers of drywall and with various thicknesses of drywall.
(2) The electrical box includes mounting fasteners that can be moved to alternate locations based on the thickness of the drywall or the number of layers of drywall used.
(3) The electrical box includes mortar anchoring tabs that allow the box to be mortared within a masonry wall.
(4) The electrical box includes multiple connection points to enable the mounting of electrical components within the box or the mounting of electrical fixtures such as light to the front of the box.
(5) The electrical box of the present invention is adapted for mounting to both metal and wood framing.
(6) Stocking requirements can be vastly reduced with the electrical box of the present invention as the one box can be used in a wide variety of structures including those with metal framing, wood framing, and for all types of exterior finishes including siding and masonry.

These and other objects and advantages of the present invention will be better understood by reading the following description along with reference to the drawings.

TABLE OF NOMENCLATURE

| Part Number | Description |
|---|---|
| 20 | electrical box, preferred embodiment |
| 22 | box member |
| 24 | first sidewalls |
| 26 | second sidewalls |
| 28 | open front |
| 30 | enclosure |
| 32 | first flange |
| 34 | second flange |
| 35 | fastening point |
| 36 | aperture in first flange |
| 38 | aperture in second flange |
| 39 | first fastening arrangement |
| 40 | mounting fastener |
| 42 | post |
| 44 | first boss or component boss |
| 46 | second boss or fixture boss |
| 48 | bore in first boss or component bore |
| 50 | bore in second boss or fixture bore |
| 52 | corner of box member |
| 54 | gap |
| 56 | front edge |
| 58 | axis through flange |
| 60 | recessed portion or recessed area |

-continued

| Part Number | Description |
| --- | --- |
| 62 | knockout |
| 63 | alignment tab |
| 64 | back wall |
| 66 | nonrecessed portion |
| 67 | second fastening arrangement |
| 68 | anchoring tab |
| 70 | wall |
| 72 | drywall |
| 74 | stud |
| 76 | hole in wall |
| 77 | face of stud |
| 78 | masonry wall |
| 80 | duplex receptacle |
| 82 | component fastener |
| 84 | faceplate |
| 90 | electrical box, second embodiment |
| 92 | fastening points |
| 94 | apertures through sidewalls |
| D1 | distance of aperture in first flange from front edge |
| D2 | distance of aperture in second flange from front edge |
| D3 | length of alignment tab |
| Θ1 | angle of mounting fastener with respect to front edge |

DETAILED DESCRIPTION OF THE INVENTION

Figure 1:
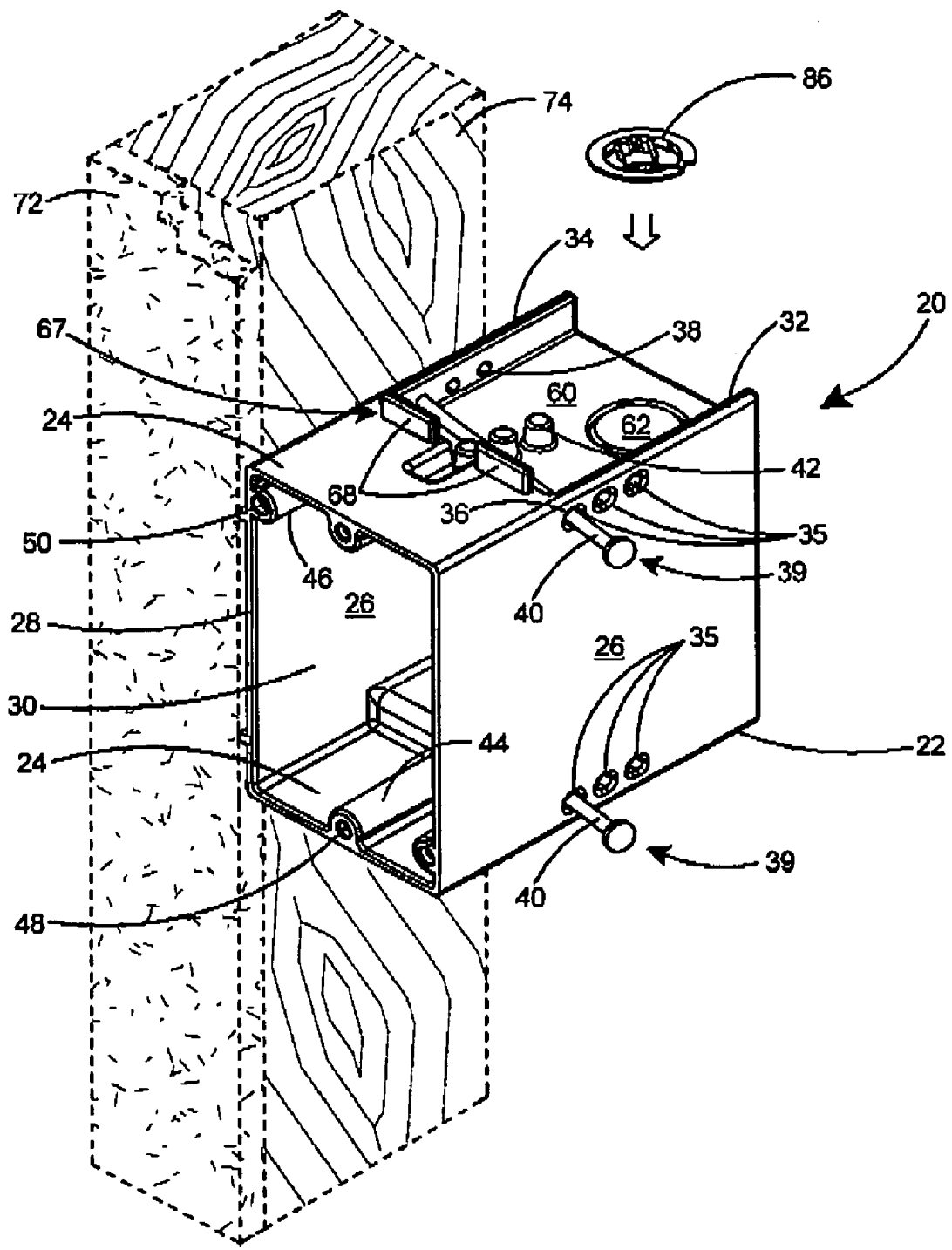
FIG. 1 is a perspective view of a preferred embodiment of the electrical box assembly of the present invention in alignment with a stud and ready to be fastened thereto.

With reference to FIG. 1, the present invention is an electrical box 20 with multiple selectable fastening points. The preferred embodiment of the electrical box 20 includes a box member 22 having first sidewalls 24, second sidewalls 26, and an open front 28 defining an enclosure 30 therein. The box member 22 includes a first flange 32 extending longitudinally along one side of the first sidewall 24 and a second flange 34 extending longitudinally along the opposite side of each first sidewall 24, with the two flanges 32 and 34 parallel to each other. The electrical box includes multiple fastening points 35 with the fastening points 35 including a plurality of apertures 36 in the first flange 32 and a plurality of apertures 38 in the second flange 34. The electrical box 20 includes a first fastening arrangement 39 for securing the box to a stud 74. The first fastening arrangement 39 includes a mounting fastener 40 secured through one of the fastening points 35 on each first sidewall 24. The mounting fasteners 40 may be captive within the apertures 36 and 38 of the flanges 32 and 34 as shown in FIG. 1 or alternatively held within the enclosure 30 in a bag (not shown) or similar storage container. When extended through the fastening points 35 or flanges 32 and 34 as shown in FIG. 1, the mounting fasteners 40 extend through and are held in one of the apertures 36 in the first flange 32 and one of the apertures 38 in the second flange 34. The electrical box 20 further includes a plurality of posts 42 extending from the first sidewalls 24 between the first flange 32 and the second flange 34.

Figure 2:
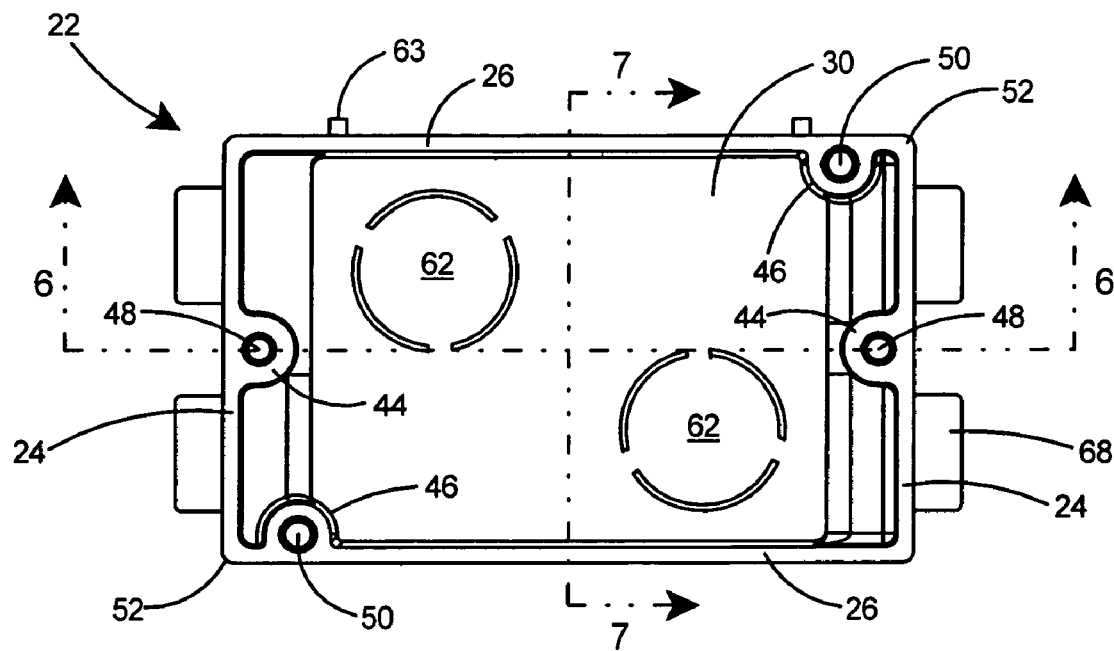
FIG. 2 is a front view of the electrical box portion of the assembly depicted in FIG. 1.
Figure 3:
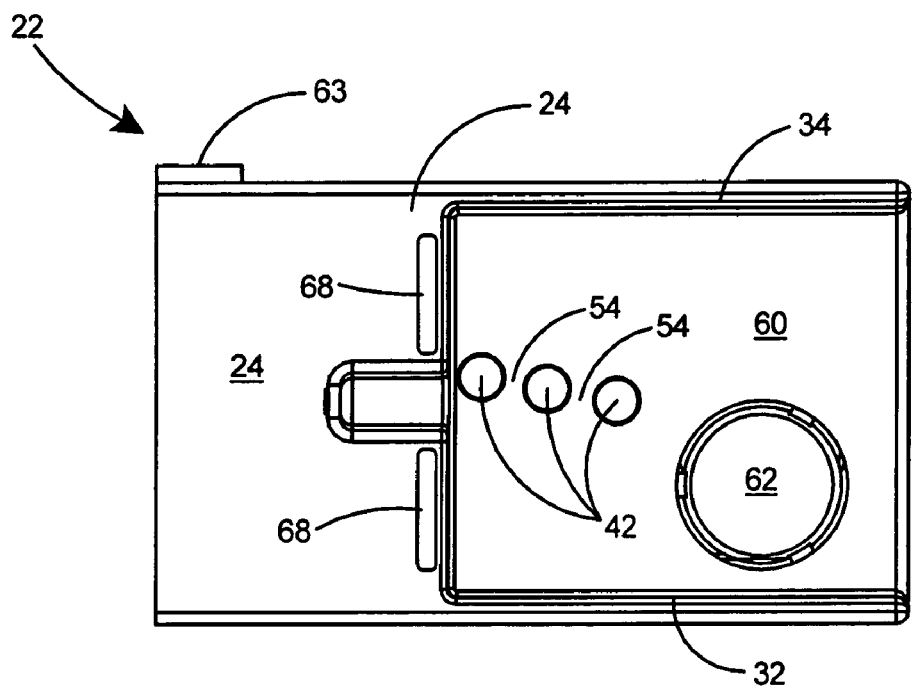
FIG. 3 is an end view of the electrical box of FIG. 2.

Referring to FIGS. 2 and 3, the box member 22 includes two component bosses or first bosses 44 integral with each of the first sidewalls 24 and extending into the enclosure 30. Two fixture bosses or second bosses 46 are provided integral with each of the second sidewalls 26 and extending into the enclosure 30. The first bosses 44 are centered on each of the first sidewalls 24 of the box member 22 and include component bores 48 therein for receipt of fasteners (not shown) for securing an electrical component within the enclosure 30. The second bosses 46 include fixture bores 50 therein that will be for receipt of fasteners (not shown) for securing an electrical fixture to the box member 22. The box member 22 is rectangular shaped and includes corners 52 at the juncture of the first sidewalls 24 and the second sidewalls 26. Preferably, the second bosses 46 are at opposing corners 52 of the box member 22. As shown in FIG. 3, the posts 42 extending from the first sidewall 24 of the box member 22 and include gaps 54 there between.

Figure 4:
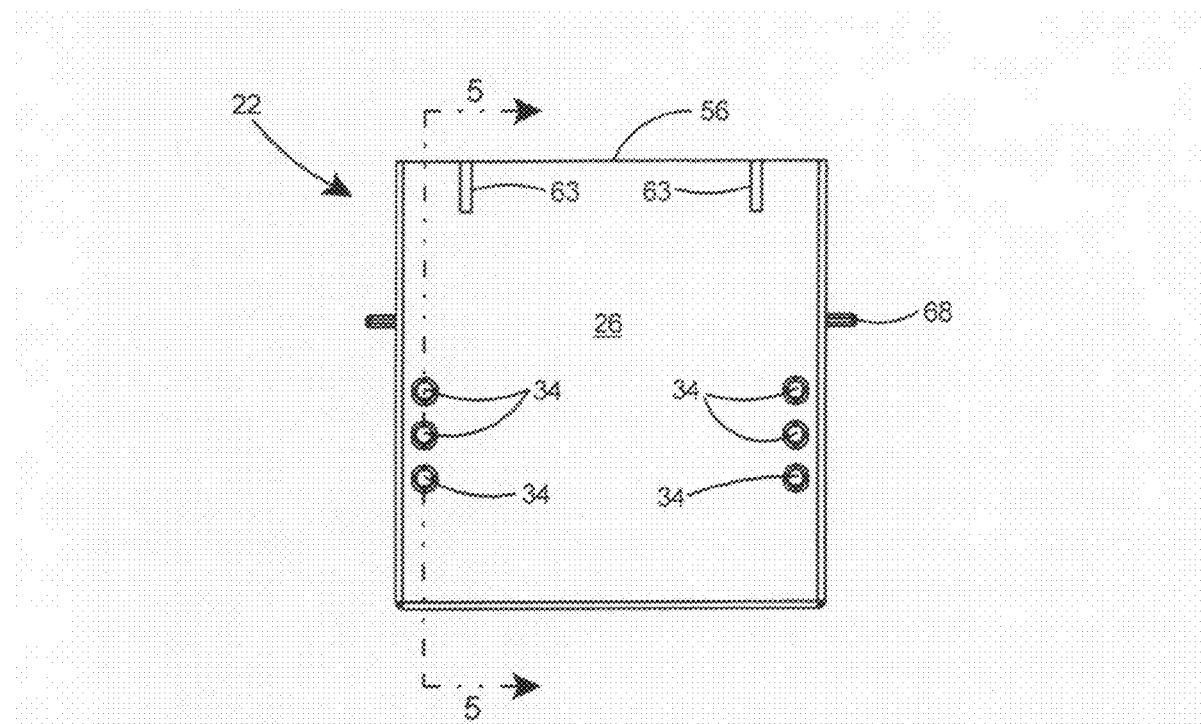
FIG. 4 is a side view of the electrical box of FIG. 2.
Figure 5:
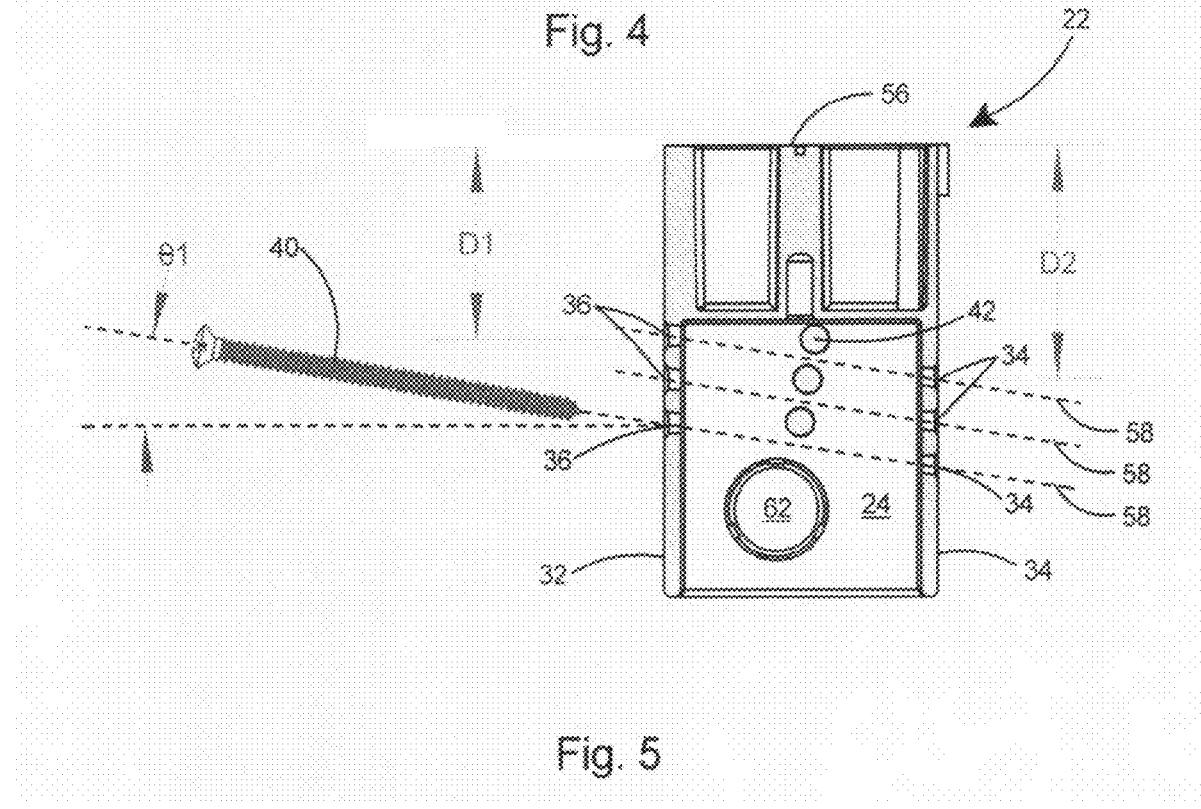
FIG. 5 is a sectional view of the electrical box taken along line 5-5 of FIG. 4.

With reference to FIGS. 4 and 5, the sidewalls 24 and 26 of the box member 22 include a front edge 56 as shown at the top of each figure. As shown in FIG. 5, the aperture 36 in the first flange 32 are nearer to the front edge 56 as shown by distance D1 for the aperture 36 nearest the front edge 56, then the apertures 38 in the second flange 34, as shown by distance D2 for the first aperture 38 in the second flange 34. The remaining apertures 36 and 38 in each flange 32 and 34 are spaced equidistant from each other. The staggered spacing of the apertures 36 and 38 with respect to the front edge 56 will orient any mounting fastener 40 placed therein through paired apertures 36 and 38 in each flange 32 and 34 at an angle Θ1 with respect to the front edge 56. Each pair of apertures 36 and 38 are depicted by the axes 58, which are the axes along which a fastener will be aligned axially when it is inserted therein. Thus, each paired aperture 36 and 38 will define a selectable fastening point which can be later chosen by the installer based upon the specific requirements of the structure it will be secured to. Preferably angle Θ1 is between 0 and 20 degrees and most preferably it is 10 degrees. Although the sectional view of the posts 42 in FIG. 5 depict them as being cylindrical in shaped, they could have a wide variety of shapes including square, rectangular, hexagonal, octagonal, or oval.

Figure 6:
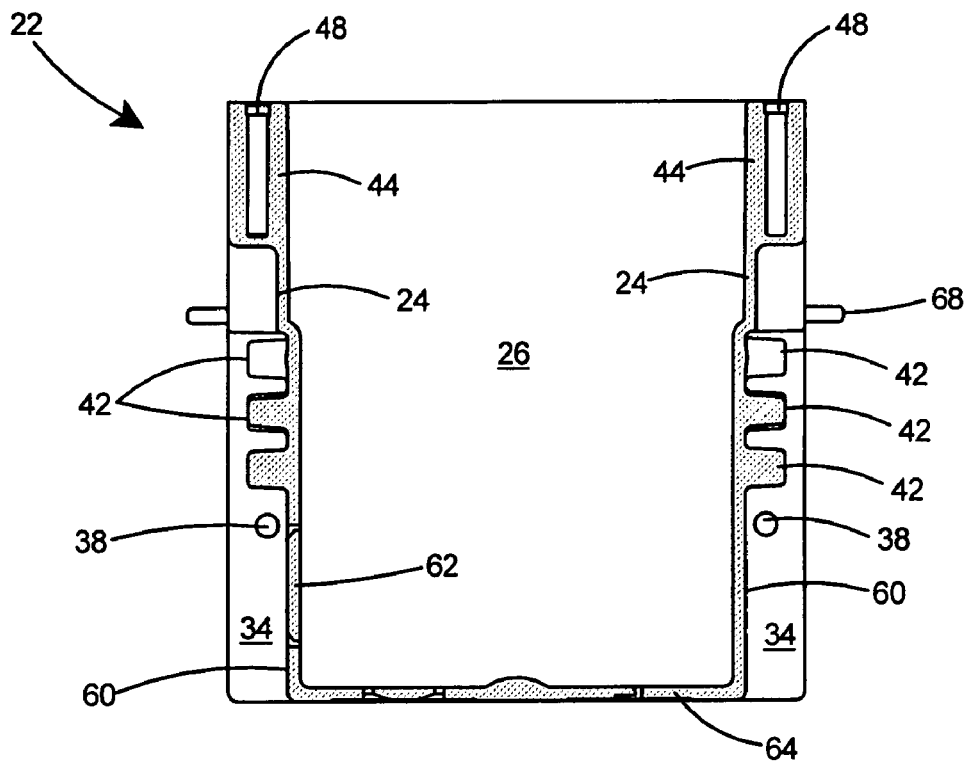
FIG. 6 is a sectional view of the electrical box taken along line 6-6 of FIG. 2.
Figure 7:
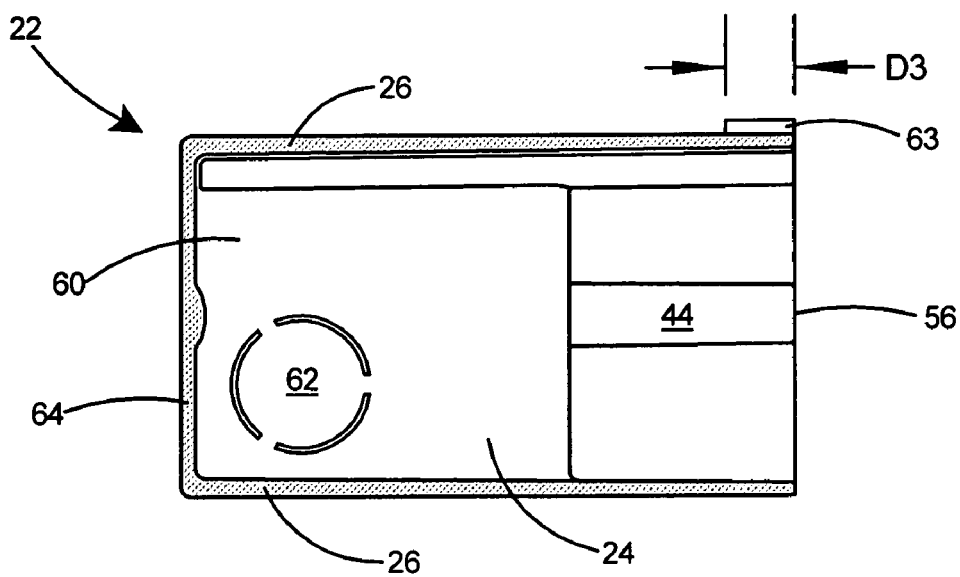
FIG. 7 is a sectional view of the electrical box taken along line 7-7 of FIG. 2.

Referring to FIG. 3, the first sidewalls 24 include a recessed area or recessed portion 60 extending between the first flange 32 and the second flange 34 and then posts 42 extending from the recessed portion. As shown in FIG. 6, the first bosses 44 include component bores 48 therein for receipt of fasteners (not shown) for securing an electrical component within the enclosure 30. As shown in FIG. 7, a knockout 62 or removable wall portion is provided in the recessed portion 60 of each first sidewall 24. The box member 22 further includes an alignment tab 63 on the outer surface of one of the second sidewalls 26. The alignment tab 63 extends from the front edge 56 of the box member 22 and provides a means of aligning the box member 22 with respect to a stud (not shown). The length D3 of the alignment tab 63 is preferably equal to or slightly less than the thickness of a single layer of standard drywall. More preferably, the alignment tab is provided in a length D3 of 0.437 inch for use with drywall of ½" nominal thickness.

Figure 8:
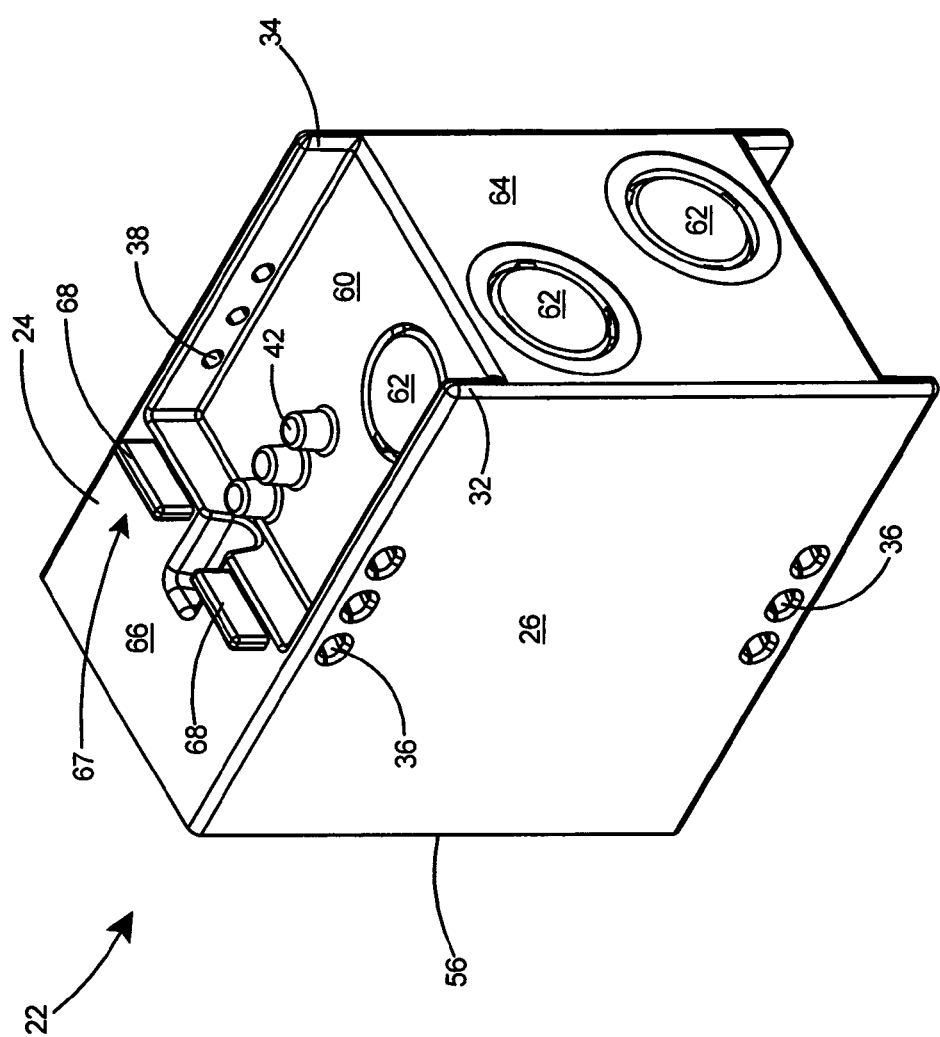
FIG. 8 is a perspective view of the electrical box of the present invention.

With reference to FIG. 8, this rear perspective view of the box member 22 depicts two additional knockouts 62 that are provided in the back wall 64 of the box member 22. The first sidewalls 24 of the box member 22 include the recessed area 60 on the rear portion of the first sidewall 24 and a front nonrecessed portion 66. A second fastening arrangement 67 is provided for securing the electrical box 20 to a masonry wall (not shown). The second fastening arrangement 67 includes anchoring tabs 68 on the nonrecessed portion 66 of the first sidewall 24, extending from the outer surface of the sidewall 24.

Figure 9:
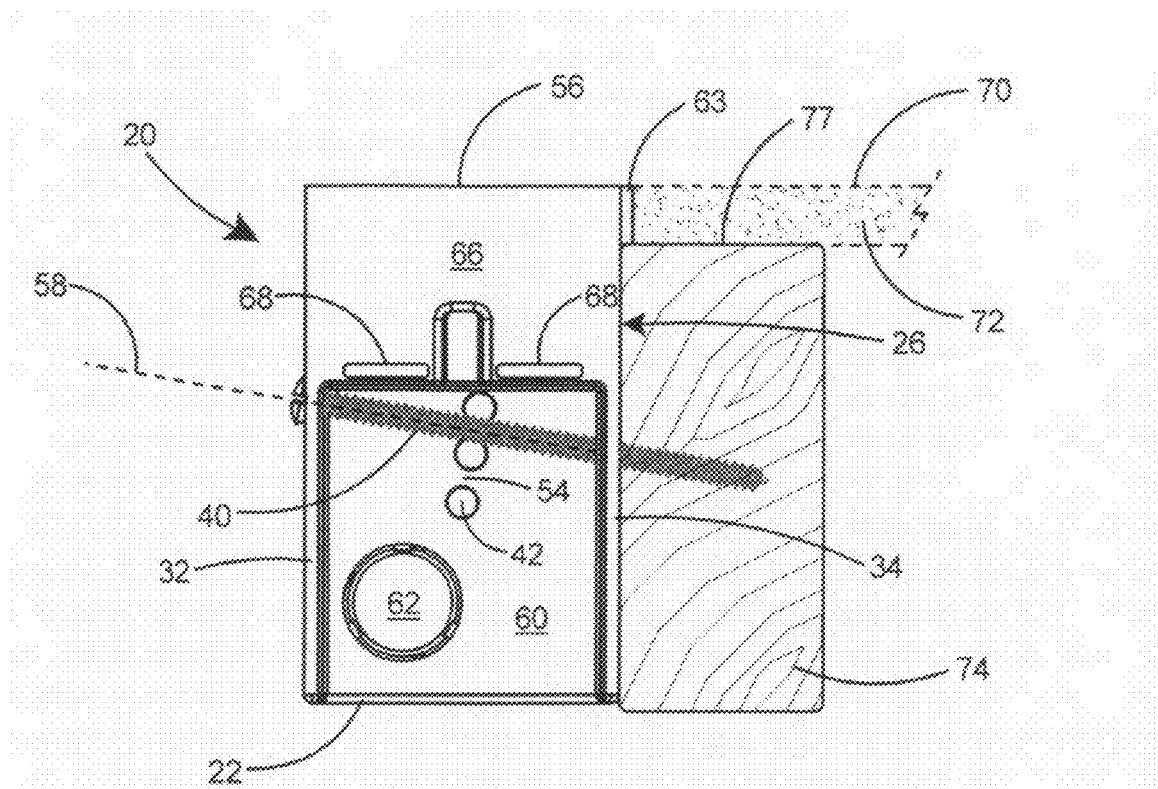
FIG. 9 is a top view of the electrical box of the present invention installed over a wall constructed of one layer of drywall.

Referring to FIG. 9, is a top view is shown of the electrical box 20 of the present invention installed on a wall 70 constructed with one layer of drywall 72. The mounting fastener 40, having an outer diameter that is greater than the gap 54 between the posts 42, is held therein by contact with at least one of the posts 42 and the apertures in each of the flanges 32 and 34.

Figure 10:
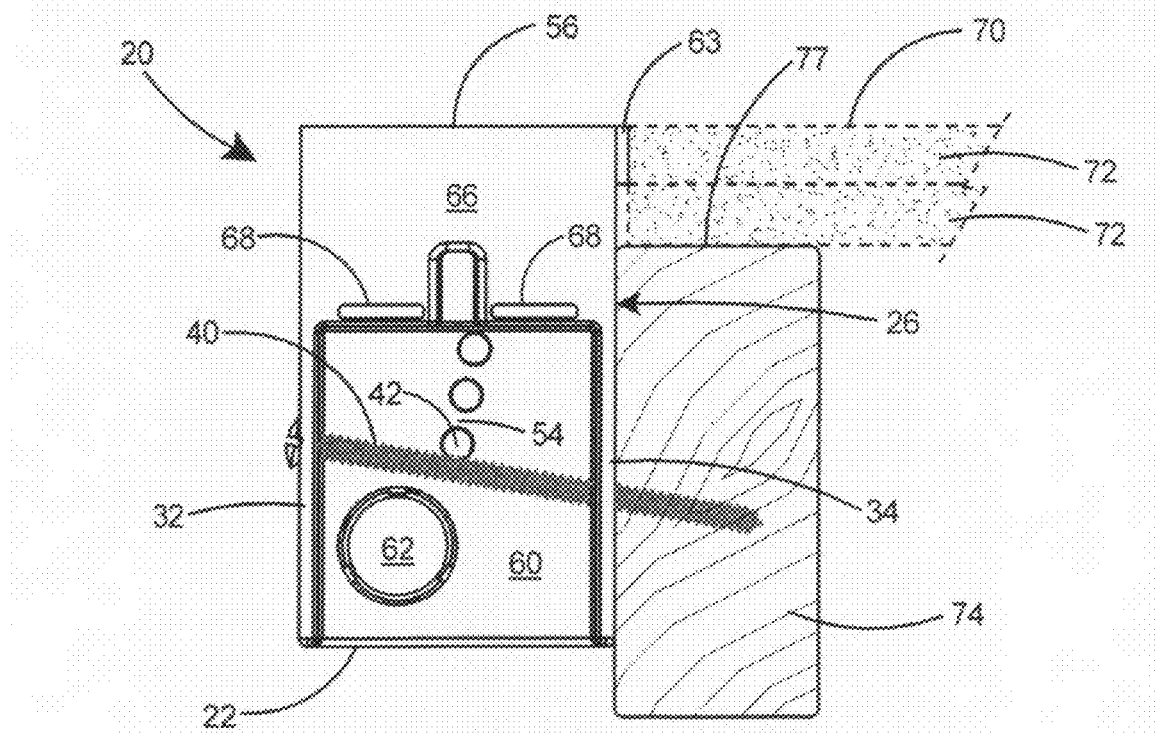
FIG. 10 is a top view of the electrical box of the present invention installed on a wall constructed of two layers of drywall.

Reference is made to FIGS. 9 and 10 for an understanding of the operation of the electrical box 20 of the present invention. As described hereinabove, the electrical box 20 is provided with mounting fasteners 40. The mounting fasteners 40 are preferably self-tapping and constructed of hardened steel so they can be driven into both wood and metal studs. Alternatively, for use with only wood studs, the mounting fasteners 40 can be nails as shown in FIG. 1.

With reference to FIG. 9 there is depicted a situation in which one layer of drywall 72 is to be installed against the framing members or studs 74. In this situation, the electrical box 20 is placed against the studs with the second sidewall 26 flush against the stud 74 and with the alignment tabs 63 flush with the face 77 of the stud 74. The installer has the option of placing the mounting fastener 40 in any one of the three positions or axes 58 through flanges 32 and 34 (see FIG. 5). In the situation depicted in FIG. 9, with one layer of drywall 72 the installer typically would install the mounting fastener 40 in the position closest to the front edge 56 of the box member 22 at this position would align the mounting fastener 40 approximately with the midpoint of the stud 74. In this position the electrical box 20 would be firmly braced against the stud 74 along a significant portion of the second sidewall 26 and the two mounting fasteners 40 would hold the electrical box 20 secure to the stud 74. The alignment tab 63 would insure that the front edge 56 of the electrical box 20 is substantially even with the wall 70.

With reference to FIG. 10 there is depicted a situation in which two layers of drywall 72 are being installed against the framing members or studs 74, which is a common procedure in those circumstances in which a firewall is being constructed or in which additional soundproofing is required. In this situation, the electrical box 20 is again placed against the studs with the second sidewall 26 flush against the stud 74. As the electrical box 20 is farther forward with respect to the stud 74, the installer would place the mounting fastener 40 in an alternative selectable fastening point. In FIG. 10 the mounting fastener 40 is installed in the rearmost selectable fastening point which aligns the mounting fastener 40 approximately with the midpoint of the stud 74. In this position the electrical box 20 would again hold the electrical box 20 secure to the stud 74. If preferred, in those situations when a smaller outer profile is desired for the box member 22, such that when space is tight, the anchoring tabs 68 can be broken off by use of pliers or similar tools to reduce the size of the box member 22.

Figure 11:
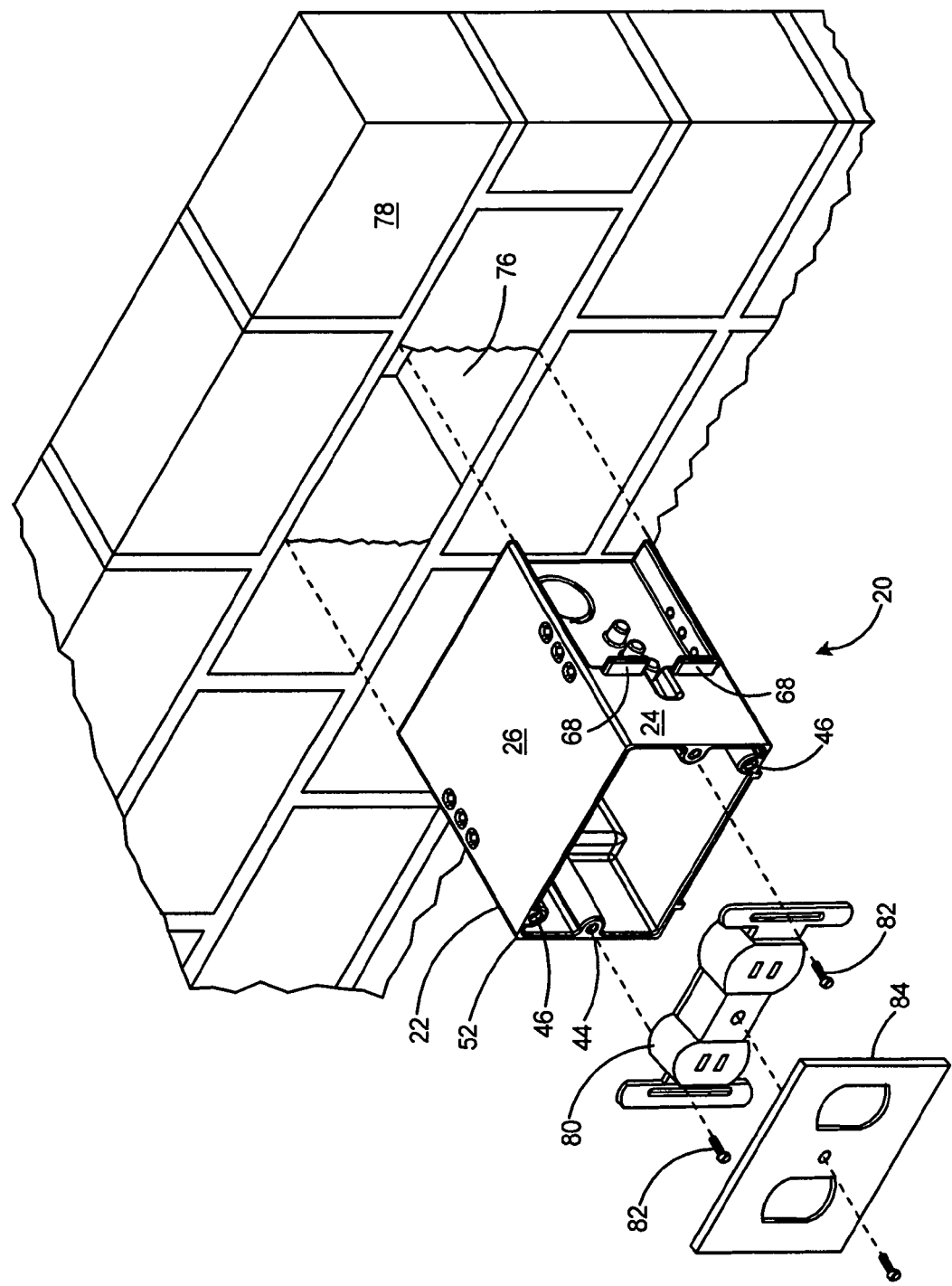
FIG. 11 is a perspective view of the electrical box of the present invention in alignment with a hole in a masonry wall and ready to be fastened thereto.

With reference to FIG. 11 there is shown a perspective view of the preferred embodiment of the electrical box 20 of the present invention in alignment with a hole 76 in a masonry wall 78. For use in a masonry wall 78, mounting fasteners are not used. The hole 76 in the masonry is typically made large enough to accept the electrical box and the anchoring tabs 68 that extend from the first sidewalls 24. The electrical box 20 is placed in the hole 76 and is mounted in place. The mortar (not shown) is packed around the outer sidewalls 24 and 26 and surrounds the anchoring tabs 68. After the mortar has dried, the electrical box 20 is anchored firmly in place in the masonry wall 78. An electrical component, such as the duplex receptacle 80 shown in FIG. 11, can then be secured to the electrical box 20 by component fasteners 82 driven into first bosses 44. A complementary faceplate 84 can then be secured to the duplex receptacle 80 to finish the installation. Alternatively, other electrical components such as switches or photocells could be installed in the electrical box. Additionally, electrical fixtures such as lightning fixtures (not shown) could be secured to the electrical box 20 by utilizing the second bosses 46 situated near the corners 52 of the electrical box 20.

Figure 12:
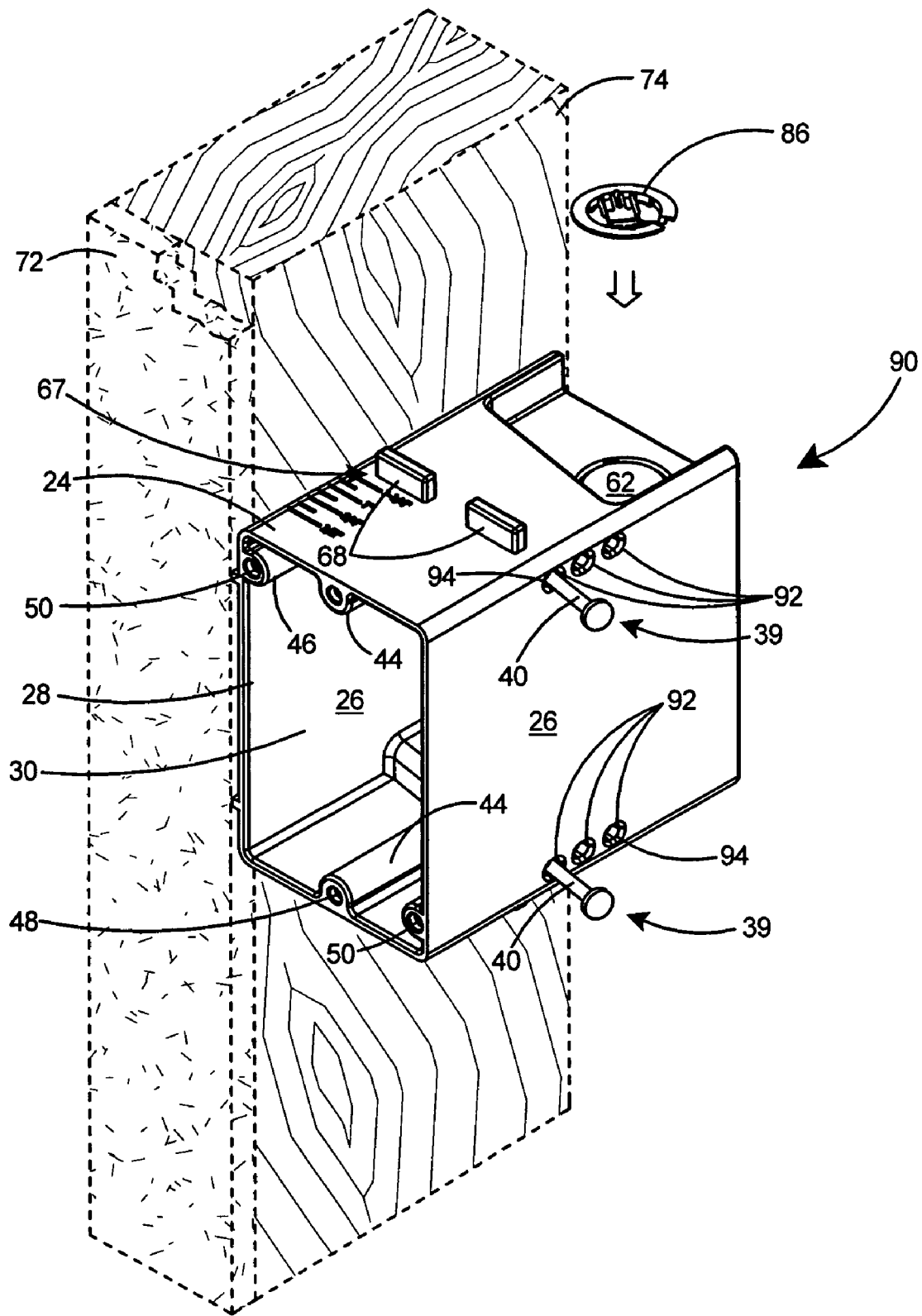
FIG. 12 is a perspective view of a second embodiment of the electrical box assembly of the present invention in alignment with a stud and ready to be fastened thereto.

Referring to FIG. 12 there is shown a second embodiment an electrical box 90 with multiple selectable fastening points 92 according to the present invention. In this embodiment of the electrical box 90, the flanges of the first embodiment have been eliminated and the fastening points 92 are apertures 94 that are cored through the first sidewalls 24 of the electrical box. In this embodiment of the electrical box 90, the first sidewalls 24 are thick enough to accommodate apertures 94 cored all the way through the box.

Preferably, the box member 22 portion of the electrical box, see FIG. 8, is constructed of plastic or metal. If constructed of plastic, the box member 22 is preferably molded in one-piece of plastic. Suitable molding plastics include polycarbonate and polyvinyl chloride. The mounting fasteners 40, see FIG. 9, are preferably either nails or screws. More preferably the mounting fasteners 40 are screws constructed of hardened steel. Most preferably, the component bores 48 are smooth bores of a diameter to accept #6 screws from an electrical component and the fixture bores 50 are smooth bores of a diameter to accept #8 screws from an electrical fixture.

As shown in FIG. 1, the recessed area 60 of electrical box 20 enables the use of electrical fittings or connectors such as the BLACK BUTTON™ push in-connector 86 for connecting non-metallic cable to the electrical box 20. The BLACK BUTTON™ push-in connector, available from Arlington Industries of Scranton, Pa., is simply pushed into one of the holes provided by removing one of the knockouts 62 provided in the recessed area 60. The recessed area 60 prevents the push-in connectors 86 from projecting outward from the sidewalls 24 and 26 of the electrical box 20 and interfering with placement of the electrical box in locations where space is tightly restricted. The "BLACK BUTTON™" connector is disclosed in U.S. Pat. No. 5,693,910, the entire contents of which are incorporated herein by reference.

Having thus described the invention with reference to a preferred embodiment, it is to be understood that the invention is not so limited by the description herein but is defined as follows by the appended claims.

What is claimed is:

1. An electrical box comprising:
    a box member including a plurality of first sidewalls, a plurality of second sidewalls, a front edge, a back wall, and an open front defining an enclosure therein;
    said front sidewalls of said box member including a non-recessed portion adjacent said front edge;
    said first sidewalls of said box member including a recessed portion adjacent said back wall;
    a first flange extending longitudinally along said recessed portion of said first sidewalls;
    a second flange extending longitudinally along said recessed portion of said first sidewalls, said second flange parallel to said first flange;
    said recessed portion of said first sidewalls extending between said first flange and said second flange;
    said flanges each including a top edge, said top edges of said flanges even with said nonrecessed portion of said first sidewalls;
    a plurality of posts extending from said recessed portion of said first sidewalls;
    a plurality of selectable fastening points on said electrical box;
    each of said fastening points including paired apertures in said flanges;
    a first fastening arrangement for securing said electrical box to a stud; and
    a second fastening arrangement including one or more anchoring tabs extending from said outer surface of said nonrecessed portion of said first sidewalls.

2. The electrical box of claim 1 wherein said first fastening arrangement includes a mounting fastener for mounting through one of said fastening points of said electrical box.

3. The electrical box of claim 2 including a gap between each of said posts.

4. The electrical box of claim 3 wherein
said mounting fastener includes an outer diameter; and
said outer diameter of said mounting fastener is greater than said gap.

5. The electrical box of claim 4 wherein
said apertures in said first flange are equal to or nearer to said front edge than said apertures in said second flange; and
said spacing of said apertures with respect to said front edge place said mounting fastener at an angle with respect to said front edge.

6. The electrical box of claim 5 wherein said angle of said mounting fastener with respect to said front edge is between 0 and 20 degrees.

7. The electrical box of claim 1 including
at least one knockout in said recessed portion of said first sidewalls and in said back wall of said box member.

8. The electrical box of claim 1 wherein
said box member includes a first boss integral with and extending inward from each of said first sidewalls; and
said box member includes a second boss integral with each of said second sidewalls.

9. The electrical box of claim 8 wherein:
said box member includes two of said first bosses;
said first bosses are centered on each of said first sidewalls; and
said first bosses include bores therein for receipt of fasteners for securing an electrical component within said enclosure.

10. The electrical box of claim 8 wherein
said box member includes two of said second bosses; and
said second bosses include bores therein for receipt of fasteners for securing an electrical fixture to said box member.

11. The electrical box of claim 10 wherein
said box member includes corners at the juncture of said first sidewalls and said second sidewalls; and
said second bosses are at opposing corners of said box member.

* * * * *